(12) United States Patent
Yi et al.

(10) Patent No.: US 9,042,364 B2
(45) Date of Patent: *May 26, 2015

(54) METHOD OF DETECTING AND HANDLING AN ENDLESS RLC RETRANSMISSION

(71) Applicant: LG ELECTRONICS INC., Seoul (KR)

(72) Inventors: Seung June Yi, Gyeonggi-Do (KR); Sung Jun Park, Gyeonggi-Do (KR); Young Dae Lee, Gyeonggi-Do (KR); Sung Duck Chun, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/259,517

(22) Filed: Apr. 23, 2014

(65) Prior Publication Data

US 2014/0233490 A1  Aug. 21, 2014

Related U.S. Application Data

(63) Continuation of application No. 12/864,608, filed as application No. PCT/KR2009/000472 on Jan. 30, 2009, now Pat. No. 8,730,969.

(60) Provisional application No. 61/024,893, filed on Jan. 30, 2008.

(30) Foreign Application Priority Data

Jan. 28, 2009 (KR) ........................ 10-2009-0006712

(51) Int. Cl.
*H04L 12/28* (2006.01)
*H04L 5/00* (2006.01)
*H04L 1/18* (2006.01)

(52) U.S. Cl.
CPC ............ *H04L 5/0055* (2013.01); *H04L 1/1874* (2013.01); *H04L 1/188* (2013.01)

(58) Field of Classification Search
USPC ......... 370/328–331, 336–339, 341–345, 437, 370/480–482, 491; 455/412, 168.1, 188.1, 455/418, 422.1, 432.1, 432.3, 434, 455/435.1–435.3, 436, 440, 444, 450, 455/452.1–452.2
See application file for complete search history.

(56) References Cited

U.S. PATENT DOCUMENTS

| | | |
|---|---|---|
| 6,895,010 B1 | 5/2005 | Chang et al. |
| 6,956,855 B1 | 10/2005 | Chang |
| 7,227,856 B2 | 6/2007 | Wu |
| 2003/0028837 A1 | 2/2003 | Oh |
| 2004/0033801 A1 | 2/2004 | Yi et al. |
| 2004/0184437 A1 | 9/2004 | Lee et al. |

(Continued)

FOREIGN PATENT DOCUMENTS

| | | |
|---|---|---|
| KR | 2001-0035467 | 5/2001 |
| KR | 2003-0008324 | 1/2003 |

*Primary Examiner* — Zewdu A Beyen
(74) *Attorney, Agent, or Firm* — Morgan, Lewis & Bockius LLP

(57) ABSTRACT

Disclosed is a radio (wireless) communication system providing a radio communication service and a terminal, and more particularly, to a method of effectively detecting and handling endless RLC retransmission so as to prevent endless RLC re-transmission occurring between the terminal and a network in an Evolved Universal Mobile Telecommunications System (E-UMTS) that has evolved from a Universal Mobile Telecommunications System (UMTS) or a Long Term Evolution (LTE) system.

6 Claims, 2 Drawing Sheets

(56) References Cited

U.S. PATENT DOCUMENTS

2005/0147040 A1 7/2005 Vayanos et al.
2005/0270996 A1 12/2005 Yi et al.
2009/0149189 A1* 6/2009 Sammour et al. ............. 455/450
2009/0161571 A1 6/2009 Terry et al.

* cited by examiner

METHOD OF DETECTING AND HANDLING AN ENDLESS RLC RETRANSMISSION

CROSS REFERENCE TO RELATED APPLICATIONS

The present application is a continuation of U.S. patent application Ser. No. 12/864,608, filed on Jul. 26, 2010, the entire disclosure of which is hereby incorporated by reference for all purposes as if fully set forth herein. U.S. patent application Ser. No. 12/864,608 is a national stage of PCT International Application No. PCT/KR2009/000472, filed on Jan. 30, 2009, and claims the benefit of U.S. Provisional Application No. 61/024,893, filed on Jan. 30, 2008. The national stage application also claims the benefit of Korean Patent Application No. 10-2009-0006712, filed on Jan. 28, 2009.

TECHNICAL FIELD

The present invention relates to a radio (wireless) communication system providing a radio communication service and a terminal, and more particularly, to a method of effectively detecting and handling endless RLC retransmission so as to prevent endless RLC retransmission occurring between the terminal and a network in an Evolved Universal Mobile Telecommunications System (E-UMTS) that has evolved from a Universal Mobile Telecommunications System (UMTS) or a Long Term Evolution (LTE) system.

BACKGROUND ART

FIG. 1 shows an exemplary network structure of a Long-Term Evolution (LTE) system as a mobile communication system to which a related art and the present invention are applied. The LTE system is a system that has evolved from the existing UMTS system, and its standardization work is currently being performed by the 3GPP standards organization.

The LTE network can roughly be divided into an Evolved UMTS Terrestrial Radio Access Network (E-UTRAN) and a Core Network (CN). The E-UTRAN is generally comprised of a terminal (i.e., User Equipment (UE)), a base station (i.e., Evolved Node B (eNode B)), an access gateway (aGW) that is located at an end of the network and connects with one or more external networks. The access gateway may be divided into a part that handles processing of user traffic and a part that handles control traffic. In this case, the access gateway part that processes the user traffic and the access gateway part that processes the control traffic may communicate with a new interface. One or more cells may exist in a single eNB. An interface may be used for transmitting user traffic or control traffic between eNBs. The CN may include the aGW and a node or the like for user registration of the UE. An interface for discriminating the E-UTRAN and the CN may be used.

FIGS. 2 and 3 show respective exemplary structures of a radio interface protocol between the terminal and the E-UTRAN based on the 3GPP radio access network standards. The radio interface protocol has horizontal layers comprising a physical layer, a data link layer, and a network layer, and has vertical planes comprising a user plane (U-plane) for transmitting user data information and a control plane (C-plane) for transmitting control signaling. The protocol layers in FIGS. 2 and 3 can be classified into a first layer (L1), a second layer (L2), and a third layer (L3) based on three lower layers of an open system interconnection (OSI) standard model widely known in the communication system. The radio protocol layers exist as pairs between the UE and the E-UTRAN and handle a data transmission in a radio interface.

The layers of the radio protocol control plane in FIG. 2 and those of the radio protocol user plane in FIG. 3 will be described as follows.

The physical layer, the first layer, provides an information transfer service to an upper layer by using a physical channel. The physical layer is connected to an upper layer called a medium access control (MAC) layer via a transport channel. Data is transferred between the MAC layer and the physical layer via the transport channel. The transport channel is divided into a dedicated transport channel and a common transport channel according to whether or not a channel is shared. Between different physical layers, namely, between a physical layer of a transmitting side and that of a receiving side, data is transmitted via the physical channel using radio resources.

The second layer includes various layers. First, a medium access control (MAC) layer performs mapping various logical channels to various transport channels and performs logical channel multiplexing by mapping several logical channels to a single transport channel. The MAC layer is connected to an upper layer called a radio link control (RLC) layer by a logical channel. The logical channel is roughly divided into a control channel that transmits information of the control plane and a traffic channel that transmits information of the user plane according to a type of transmitted information.

A Radio Link Control (RLC) layer of the second layer segments and/or concatenates data received from an upper layer to adjust the data size so as for a lower layer to suitably transmit the data to a radio interface. In addition, in order to guarantee various Quality of Services (QoSs) required by each radio bearer (RB), the RLC layer provides three operational modes: a Transparent Mode (TM); an Unacknowledged Mode (UM); and an Acknowledged Mode (AM). In particular, the AM RLC performs a re-transmission function through an Automatic Repeat and Request (ARQ) for a reliable data transmission.

A Packet Data Convergence Protocol (PDCP) layer of the second layer performs a function called header compression that reduces the size of a header of an IP packet, which is relatively large and includes unnecessary control information, in order to effectively transmit the IP packet such as an IPv4 or IPv6 in a radio interface having a narrow bandwidth. The header compression increases transmission efficiency between radio interfaces by allowing the header part of the data to transmit only the essential information. In addition, the PDCP layer performs a security function in the LTE system. The security function includes ciphering for preventing data wiretapping by a third party, and integrity protection for preventing data manipulation by a third party.

The Radio Resource Control (RRC) layer located at the lowermost portion of the third layer is defined only in the control plane, and controls a logical channel, a transport channel and a physical channel in relation to the configuration, reconfiguration, and release of radio bearers (RBs). In this case, the RBs refer to a logical path provided by the first and second layers of the radio protocol for data transmission between the UE and the UTRAN. In general, configuration (establishment, setup) of the RB refers to the process of stipulating the characteristics of a radio protocol layer and a channel required for providing a particular data service, and setting the respective detailed parameters and operational methods. The RBs include two types: a Signaling RB (SRB) and a Data RB (DRB). The SRB is used as a path for transmitting an RRC message on a C-plane, and the DRB is used as a path for transmitting user data on a U-plane.

Hereinafter, the RLC layer will be explained in more detail. As mentioned above, the RLC layer operates in three modes, TM, UM, and AM. Since the RLC layer performs a simple function in the TM, only the UM and AM will be explained.

The UM RLC generates each Packet Data Unit (PDU) with a PDU header including a Sequence Number (SN), thereby allowing a receiving side to know which PDU has been lost while being transmitted. Accordingly, the UM RLC transmits broadcast/multicast data or transmits real-time packet data such as voice (e.g., VoIP) of a Packet Service domain (PS domain) or streaming on a user plane. Also, on a control plane, the UM RLC transmits, to a specific terminal or specific terminal group in a cell, an RRC message requiring no response for reception acknowledgement.

Similar to the UM RLC, the AM RLC generates each PDU with a PDU header including a Sequence Number (SN). Differently from the UM RLC, in the AM RLC, a receiving side performs acknowledgement for PDUs transmitted from a sending side. In the AM RLC, the reason why the receiving side performs acknowledgement is to request the sending side to retransmit a PDU if the receiving side fails to receive the PDU. The re-transmission function is the main characteristic part of the AM RLC. The AM RLC aims to guarantee error-free data transmission using the re-transmission function. To this end, the AM RLC handles transmission of non-real time packet data such as TCP/IP of PS domain on the user plane, and transmits an RRC message that necessarily requires a reception acknowledgement among RRC message transmitted to a specific terminal in a cell on the control plane.

In terms of directionality, the UM RLC is used for uni-directional communications, while the AM RLC is used for bi-directional communications due to feedback from the receiving side. The UM RLC is different from the AM RLC in the aspect of configuration. The UM RLC and the AM RLC are different in terms of structural aspect: the UM RLC is that a single RLC entity has only one structure of transmission or reception but the AM RLC is that both a sending side and a receiving side exist in a single RLC entity.

The AM RLC is complicated due to its re-transmission function for data. The AM RLC is provided with a retransmission buffer as well as a transmission/reception buffer for retransmission management. The AM RLC performs many functions, e.g., usage of a transmission/reception window for flow control, polling to request a status information (status report) from a receiving side of a peer RLC entity by a sending side, a receiving side's status report informing about its buffer status to a sending side of a peer RLC entity, and generating of a status PDU to transmit status information, or the like. In order to support those functions, the AM RLC requires to have various protocol parameters, status variables, and timers. The PDUs used for controlling data transmission in the AM RLC, such as the status report, a status PDU, or the like, are called Control PDUs, and the PDUs used for transferring user data are called Data PDUs.

In the AM RLC, the RLC Data PDU is further divided into an AMD PDU and an AMD PDU segment. The AMD PDU segment has a portion of data belonging to the AMD PDU. In the LTE system, a maximum size of a data block transmitted by the terminal may vary at each transmission. For instance, having generated and transmitted an AMD PDU having a size of 200 bytes at a certain time period, a sending side AM RLC entity is required to retransmit the AMD PDU since it has received a NACK from a receiving side AM RLC. Here, if a maximum size of a data block which can be actually transmitted is assumed 100 bytes, the AMD PDU cannot be retransmitted in its original form. To solve this problem, the AMD PDU segments are used. The AMD PDU segments refer to the AMD PDU divided into smaller units. During such process, the sending side AM RLC entity divides the AMD PDU into the AMD PDU segments so as to transmit the same over a certain period of time. Then, the receiving side AM RLC entity decodes the AMD PDU from the received AMD PDU segments.

In the related art, the PDCP layer as an upper layer of the RLC has a timer for each PDCP SDU (Service Data Unit). If an ACK is not received until the timer expires, the PDCP layer discards the corresponding PDCP SDU and Protocol Data Unit (PDU), and simultaneously, commands the RLC to discard the corresponding PDCP PDU, i.e., the RLC SDU. Upon receiving the RLC SDU discard indication, the AM RLC would discard the RLC SDU if no segment of the RLC SDU has been mapped to an AMD PDU yet and thusly stored in the RLC buffer. However, if at least one segment of the RLC SDU has already been mapped to an AMD PDU, the AM RLC would not discard the RLC SDU but retransmit the RLC SDU until an ACK is received.

In the related art, there is no restriction on the PDU retransmission by the AM RLC, such as a maximum allowable time or frequency for transmission, or the like. This is because the LTE system having employed technologies, such as OFDM, MIMO, HARQ and the like, assumes that the transmission in the physical layer is stable. That is, since the physical layer has a very low transmission error rate, any restrictions on the retransmission in the RLC layer are not necessary. Therefore, the AM RLC in theory may perform endless retransmission.

For some reasons, however, the RLC may continually fail to retransmit. Among those, a variety of status parameters of the RLC protocol may malfunction by a protocol error (residual error) that is not detected even by the Cyclic Redundancy Check (CRC) in the physical layer, or the receiving side may continually discard the PDUs having successfully been transmitted by the sending side due to different RLC implementation schemes between the terminal and the network. With such RLC-associated problems, there is a possibility to fail even if the retransmission is endlessly performed. Therefore, there is a need to have a solution for the endless retransmission by the RLC.

DISCLOSURE OF INVENTION

Technical Solution

Therefore, an object of the present invention is to prevent an endless PDU re-transmission by the AM RLC so as to prevent the RLC protocol from a deadlock situation.

For this, the present invention has proposed that the AM RLC restricts a re-transmission of a specific SDU or PDU including the SDU by a retransmission time or frequency, and if the retransmission is performed until it reaches to the restricted time or frequency, the AM RLC considers it as an endless retransmission situation, thus to inform such error to the upper RRC layer. In particular, when limiting the SDU or PDU retransmission by a certain time or frequency, a timer or counter is not started for all RLC SDUs or AMD PDUs. Instead, the timer or counter is started only for an RLC SDU having received a discard indication by the PDCP or an AMD PDU including the RLC SDU, thereby minimizing the number of timers or counters to be used.

To achieve this and other advantages and in accordance with the purpose of the present invention, as embodied and broadly described herein, there is provided a method of retransmitting data unit between a terminal and a network in wireless communication system, the method comprising: determining if a counting condition is triggered, wherein the counting condition is triggered when at least one portion of the data unit is allocated with a radio link control (RLC)

sequence number; and setting a counter for retransmission of the data unit when the counting condition is triggered.

To achieve this and other advantages and in accordance with the purpose of the present invention, as embodied and broadly described herein, there is also provided a method of retransmitting data unit between a terminal and a network in wireless communication system, the method comprising: determining if a timer starting condition is triggered, wherein the timer starting condition is triggered when at least one portion of the data unit is allocated with a radio link control (RLC) sequence number; and setting a timer for retransmission of the data unit when the timer starting condition is triggered.

MODE FOR THE INVENTION

One aspect of this disclosure relates to the recognition by the present inventors about the problems of the related art as described above, and further explained hereafter. Based upon this recognition, the features of this disclosure have been developed.

Although this disclosure is shown to be implemented in a mobile communication system, such as a UMTS developed under 3GPP specifications, this disclosure may also be applied to other communication systems operating in conformity with different standards and specifications.

Hereinafter, description of structures and operations of the preferred embodiments according to the present invention will be given with reference to the accompanying drawings.

As described above, the present invention aims to prevent an endless PDU re-transmission by the AM RLC so as to prevent the RLC protocol from a deadlock situation.

To this end, the present invention has proposed that the AM RLC restricts a re-transmission of a specific SDU or PDU including the SDU by a retransmission time or frequency, and if the retransmission is performed until it reaches to the restricted time or frequency, the AM RLC considers it as an endless retransmission situation, thus to inform such error to the upper RRC layer. In particular, when limiting the SDU or PDU retransmission by a certain time or frequency, a timer or counter is not started for all RLC SDUs or AMD PDUs. Instead, the timer or counter is started only for an RLC SDU having received a discard indication by the PDCP or an AMD PDU including the RLC SDU, thereby minimizing the number of timers or counters to be used.

Figure 1:
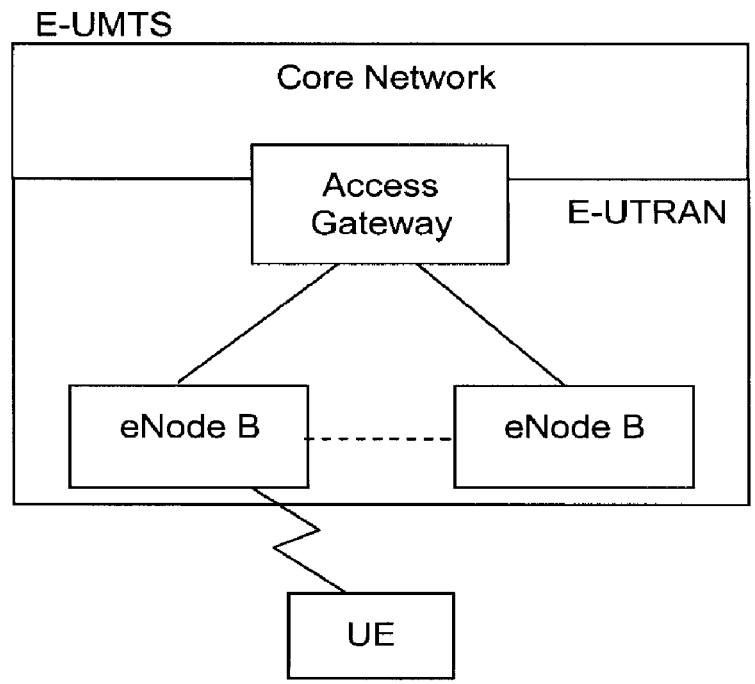
FIG. 1 shows an exemplary network structure of an Evolved Universal Terrestrial Radio Access Network (E-UTRAN) as a mobile communication system to which a related art and the present invention are applied.
Figure 2:
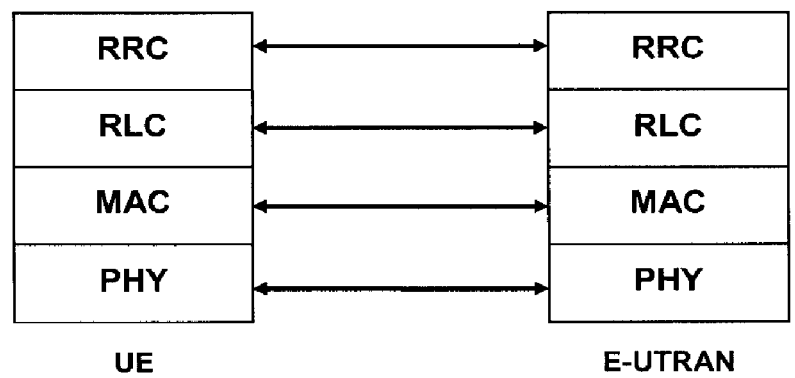
FIG. 2 is an exemplary view of related art control plane architecture of a radio interface protocol between a terminal and an E-UTRAN.
Figure 3:
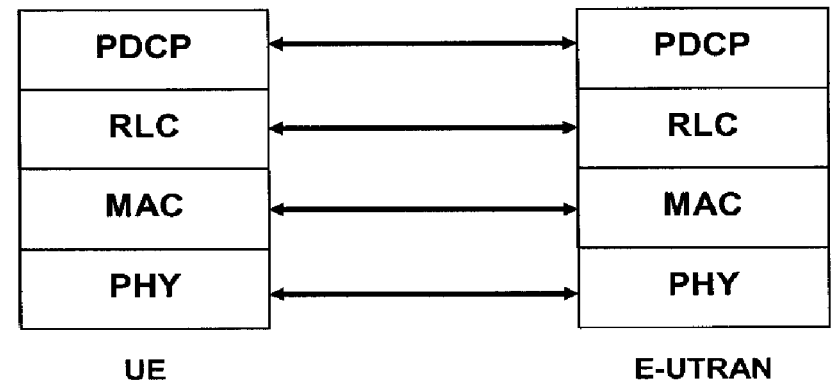
FIG. 3 is an exemplary view of related art user plane architecture of a radio interface protocol between a terminal and an E-UTRAN.
Figure 4:
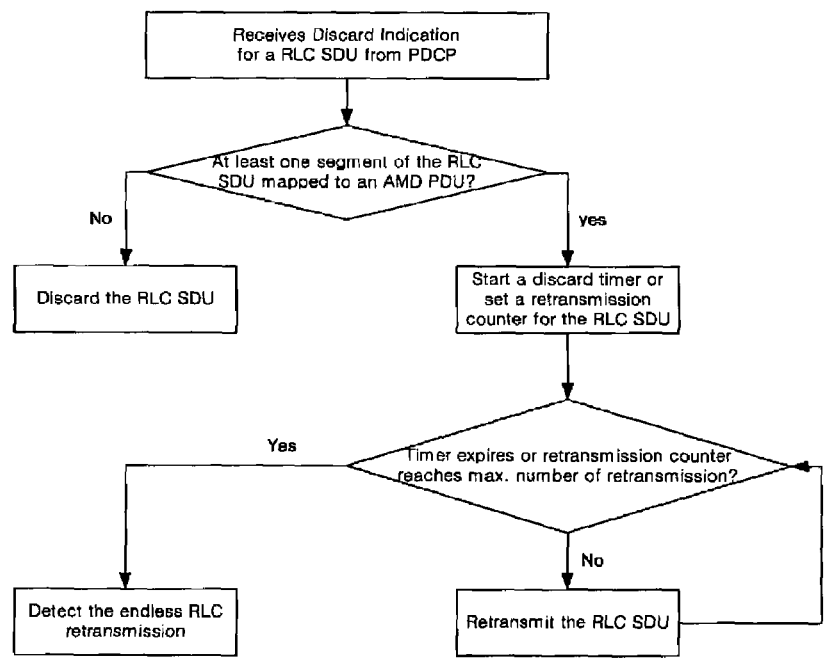
FIG. 4 is an exemplary view of a method of detecting an endless RLC re-transmission according to the present invention.

FIG. 4 is an exemplary view of a method of detecting an endless RLC re-transmission according to the present invention. Referring to FIG. 4, a method of detecting an endless retransmission error may now be described in more detail.

First, descriptions of a method of detecting an endless retransmission situation using a timer will now be given. If the AM RLC receives a discard indication for a specific RLC SDU from the upper layer PDCP, the AM RLC immediately discards the SDU if no segment of the RLC SDU has been mapped to an AMD PDU yet. On the contrary, if at least one segment of the RLC SDU has already been mapped to an AMD PDU, the AM RLC starts a timer such that if an ACK is not received until the timer expires, it is considered as an endless retransmission situation. Here, the timer value is transferred through the RRC at the RB setup, and a timer is started for each SDU in which at least one segment of the SDU having received a discard indication by the PDCP has already been mapped to an AMD PDU. And, a basis for determining which SDU is transmitted, in a perspective of the RLC, is that whether at least one segment of the SDU is included in the AMD PDU. This is because an RLC sequence number is added when the AMD PDU is generated. Accordingly, if the PDU is not transmitted to the receiving side RLC, a gap is generated in the RLC SN in the receiving side, which leads to a protocol error.

Such described method will be given in the following procedure text.

at RB setup, RRC gives a timer expiry value to RLC.
      when PDCP indicates to RLC to discard a particular RLC SDU, the RLC transmitter shall:
      if no segment of the RLC SDU has been mapped to an AMD PDU yet:
      discard the indicated RLC SDU;
      else (at least one segment of the RLC SDU has already been mapped to an AMD PDU):
      start a timer for the RLC SDU (a timer is started for each RLC SDU that the PDCP indicates to RLC to discard);
      if the RLC transmitter does not receive ACK for the RLC SDU until the timer expires, the RLC transmitter shall consider it as an endless RLC retransmission situation.

Next, a method of detecting an endless retransmission situation using a counter is described. As another method of detecting the endless retransmission situation, a maximum number of retransmission may be used. An operation method thereof is similar to that using the timer except that a counter, instead of a timer, is used. That is, if the AM RLC receives a discard indication for a specific RLC SDU from the upper layer PDCP, the AM RLC immediately discards the SDU if no segment of the SDU has been mapped to an AMD PDU yet. On the contrary, if at least one segment of the SDU has already been mapped to an AMD PDU, the AM RLC sets the counter so as to count the number of retransmission. If an ACK for the SDU has not been received until the counter reaches the maximum number of retransmission, it is considered as an endless retransmission situation. Here, the maximum number of retransmission is transferred through the RRC at the RB setup, and the counter is set for each SDU in which at least one segment of the SDU having received a discard indication by the PDCP has already been mapped to an AMD PDU. The counter is incremented by 1 after each retransmission of the SDU. And, a basis for determining which SDU is transmitted, in the perspective of the RLC, is similar to that using the timer, that whether at least one segment of the SDU is included in the AMD PDU.

Such described method will be given in the following procedure text.

at RB setup, RRC gives a maximum number of retransmission value to RLC.
      when PDCP indicates to RLC to discard a particular RLC SDU, the RLC transmitter shall:
      if no segment of the RLC SDU has been mapped to an AMD PDU yet:
      discard the indicated RLC SDU.

else (at least one segment of the RLC SDU has already been mapped to an AMD PDU):
  set a state variable that counts the number of retransmission for the RLC SDU to initial value. (A state variable is configured for each RLC SDU that the PDCP indicates to RLC to discard)
  for each retransmission of the RLC SDU, the RLC transmitter shall increment the state variable by one.
  if the value of the state variable reaches the maximum value, the RLC transmitter shall consider it as an endless retransmission situation.

Once the endless RLC retransmission situation is detected with such described method, the endless RLC retransmission situation should be solved. Methods for solving the endless RLC retransmission situation may include the following:

First, such situation may be solved by the RLC itself. That is, an RLC SDU discard and a MRW movement may be employed. The transmitting side RLC discards the SDU having the endless retransmission situation, shifts a starting point of a transmitting window to a SDU that has not been firstly received an ACK among the successive SDUs after the discarded SDU, and transmits a Move Receiving Window command to the receiving side RLC so as to shift a starting point of a receiving window to a SDU that has not been firstly received an ACK among the successive SDUs after the discarded SDU. Alternatively, an RLC reset method may be employed, in which the transmitting side RLC is reset by itself so as to initialize all status parameters, timers or the like, and then transmits the reset indication to the receiving side RLC, thus to reset the receiving side RLC.

In addition, a method using an RRC signaling may be used. That is, if an endless re-transmission situation occurs, the transmitting side RLC informs such situation to its RRC, and the transmitting side RRC informs the same to the receiving side RRC through an RRC signaling, thus to re-establish a corresponding RB (RB re-establishment). Alternatively, if an endless retransmission situation occurs, the transmitting side RLC informs such situation to its RRC, and the transmitting side RRC re-establishes an RRC connection, thus to re-establish all RBs (RRC connection re-establishment).

Namely, the related art has not provided any solution for the endless retransmission situation, causing the protocol to be in a deadlock situation. The present invention proposes a solution using a timer or a counter so as to enable the wireless protocol to stably operate in a mobile communication system. In particular, the timer or the counter is set to start under a specific condition only, thereby highly reducing the number of the timers or counters to be used for the solution.

The present disclosure may provide a method of retransmitting data unit between a terminal and a network in wireless communication system, the method comprising: determining if a counting condition is triggered, wherein the counting condition is triggered when at least one portion of the data unit is allocated with a radio link control (RLC) sequence number; and setting a counter for retransmission of the data unit when the counting condition is triggered, wherein the data unit is either RLC PDU (Protocol Data Unit) or RLC SDU (Service Data Unit), a radio link control (RLC) layer receives a discard indication to discard the data unit from an upper layer, the RLC layer is operated in an Acknowledged Mode (AM), a data unit retransmission error is occurred when a number of retransmission of the data unit exceeds a maximum retransmission number assigned to the counter, the maximum retransmission number of the counter is assigned by receiving a RRC message, and the counter is incremented by 1 after each retransmission of the data unit.

It can be also said that the present disclosure may provide a method of retransmitting data unit between a terminal and a network in wireless communication system, the method comprising: determining if a timer starting condition is triggered, wherein the timer starting condition is triggered when at least one portion of the data unit is allocated with a radio link control (RLC) sequence number; and setting a timer for retransmission of the data unit when the timer starting condition is triggered, wherein the data unit is either RLC PDU (Protocol Data Unit) or RLC SDU (Service Data Unit), a radio link control (RLC) layer receives a discard indication to discard the data unit from an upper layer, the RLC layer is operated in an Acknowledged Mode (AM), a data unit retransmission error is occurred if the retransmission of the data unit is not successfully received before an expiry of the timer, a timer value assigned to the timer is received through a RRC message, the upper layer is a PDCP (Packet Data Convergence Protocol) layer.

Although the present disclosure is described in the context of mobile communications, the present disclosure may also be used in any wireless communication systems using mobile devices, such as PDAs and laptop computers equipped with wireless communication capabilities (i.e. interface). Moreover, the use of certain terms to describe the present disclosure is not intended to limit the scope of the present disclosure to a certain type of wireless communication system. The present disclosure is also applicable to other wireless communication systems using different air interfaces and/or physical layers, for example, TDMA, CDMA, FDMA, WCDMA, OFDM, EV-DO, Wi-Max, Wi-Bro, etc.

The exemplary embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.).

Code in the computer readable medium may be accessed and executed by a processor. The code in which exemplary embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present disclosure, and that the article of manufacture may comprise any information bearing medium known in the art.

As the present disclosure may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

The invention claimed is:

1. A method of retransmitting data unit, performed by an Acknowledged Mode Radio Link Control (AM RLC) entity of a transmitter, in a wireless communication system, the method comprising: receiving, at the Acknowledged Mode Radio Link Control (AM RLC) entity of the transmitter, a discard indication for a Radio Link Control Service Data Unit (RLC SDU) from a Packet Data Convergence Protocol (PDCP) entity of the transmitter;

discarding the RLC SDU in response to no segment of the RLC SDU being mapped to an Acknowledged Mode Data (AMD) Protocol Data Unit (PDU) or a portion of the AMD PDU;

setting a state variable that counts a number of retransmission associated with the RLC SDU and delivering an indication to an upper layer of the AM RLC entity in response to the state variable reaching a maximum retransmission value, wherein the AM RLC entity sets the state variable only when:

the AM RLC entity receives the discard indication for the RLC SDU from the PDCP entity, and in response to at least one segment of the RLC SDU being mapped to the AMD PDU or the portion of the AMD PDU.

2. The method of claim 1, wherein the maximum retransmission value is assigned by receiving a Radio Resource Control (RRC) message.

3. The method of claim 1, wherein the state variable is incremented by 1 after each retransmission.

4. An apparatus configure for retransmitting data unit, performed by an Acknowledged Mode Radio Link Control (AM RLC) entity of a transmitter, in a wireless communication system, the apparatus comprising:

a processor configured to:

implement an Acknowledged Mode Radio Link Control (AM RLC) entity;

receive a discard indication, at the Acknowledged Mode Radio Link Control (AM RLC) entity of the transmitter, for a Radio Link Control Service Data Unit (RLC SDU) from a Packet Data Convergence Protocol (PDCP) entity of the transmitter;

discard the RLC SDU in response to no segment of the RLC SDU being mapped to an Acknowledged Mode Data (AMD) Protocol Data Unit (PDU) or a portion of the AMD PDU;

set a state variable that counts a number of retransmission associated with the RLC SDU; and deliver an indication to an upper layer of the AM RLC entity in response to the state variable reaching a maximum retransmission value, wherein the AM RLC entity sets the state variable only when:

the AM RLC entity receives the discard indication for the RLC SDU from the PDCP entity, and in response to at least one segment of the RLC SDU is mapped to the AMD PDU or to the portion of the AMD PDU.

5. The apparatus of claim 4, wherein the maximum retransmission value is assigned by receiving a Radio Resource Control (RRC) message.

6. The apparatus of claim 4, wherein the state variable is incremented by 1 after each retransmission.

* * * * *